W. T. DONNELLY.
TRACTION GEAR.
APPLICATION FILED APR. 10, 1915.
1,212,462.
Patented Jan. 16, 1917.
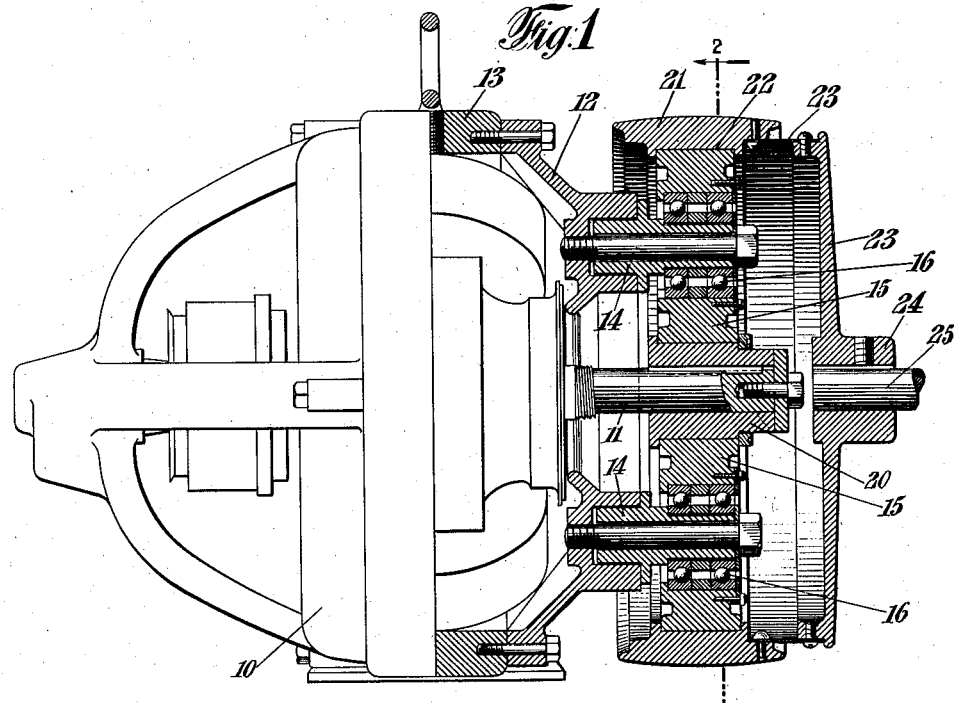
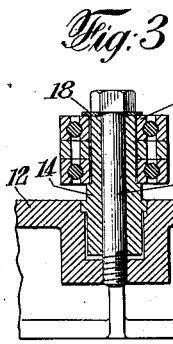
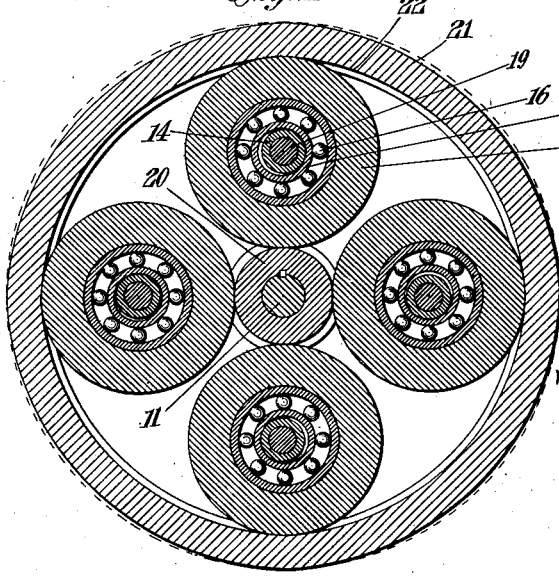
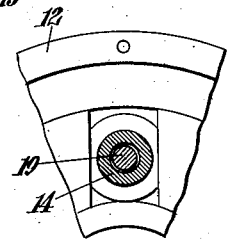
INVENTOR
William T. Donnelly
BY
ATTORNEY.

UNITED STATES PATENT OFFICE.

WILLIAM T. DONNELLY, OF BROOKLYN, NEW YORK.

TRACTION-GEAR.

1,212,462. Specification of Letters Patent. Patented Jan. 16, 1917.

Application filed April 10, 1915. Serial No. 20,387.

*To all whom it may concern:*

Be it known that I, WILLIAM T. DONNELLY, a citizen of the United States, and a resident of Brooklyn, in the county of Queens and State of New York, have invented certain new and useful Improvements in Traction-Gear, of which the following is a specification.

The invention relates to transmission or coupling apparatus of the traction gear type and more particularly to a speed increasing or reducing mechanism with constant velocity ratio and adapted to transmit rotation from a driving member to a driven member.

It has for its object to provide such means in self-contained form suitable for insertion into a train of mechanism, as well as to construct the same in a manner such that the parts thereof will act through rolling contact and thereby insure smoothness in running and a perfectly positive action.

To this end, the invention consists in associating within a resilient annular element a plurality of rolling members which ride upon the inner surface of said element and which coöperate with a central member adapted to drive or be driven, the whole being bound together by the said circumscribing annular element which possesses sufficient resiliency to exert a predetermined and permanent pressure upon the remaining members by undergoing a certain deformation within its elastic limit. The radial stresses set up thereby are, moreover, greatly in excess of the traction stresses, thus precluding any relative movement other than desired rolling contact.

In the accompanying drawings, which illustrate the invention as applied to an electro-motor, Figure 1 is an elevation of the motor and a vertical section of the attached transmission apparatus. Fig. 2 is a transverse section therethrough and taken on the line 2—2, Fig. 1. Figs. 3 and 4 are fragmentary detail views illustrating the manner of mounting the intermediate rolls employed.

Similar characters of reference designate corresponding parts throughout the several views.

Referring to the drawings, 10 designates suitable mechanism which may be driven or may drive, and as herein shown, may be an electro-motor or the like adapted to rotate a shaft 11 extending therefrom. The transmission or coupling apparatus for the same and forming the subject of the present application is designed to be self-contained, and is adapted to be attached to the said motor 10 as by means of a bracket 12 which may be secured thereto in any well-known manner as, for example, to the field frame 13 thereof. The bracket 12 is designed to sustain the entire transmission apparatus; and the driving shaft 11 of said motor is preferably arranged to be centrally disposed therein. Studs 14 extend outwardly from the said bracket to receive a plurality of intermediate rolls 15 which are journaled thereon, suitable ball bearings 16 being provided if desired. The axes of all these studs are parallel to one another and the studs are in number corresponding to the desired number of rolls. In mounting the rolls 15 on their corresponding studs 14, the diameter of a stud is preferably made slightly less than the inside diameter of the inner sleeve 17 of the ball bearing, Fig. 3, and which sleeve is held in position by the side clamping due to the setting up of a holding washer 18 under the head of the bolt 19 of said stud. This results in an eccentric mounting of the bearing upon the stud and allows of slight adjustment radially to compensate for any wear of the rolling contact surfaces. Or, as shown in Fig. 4, the diameter of the bolt 19 may be made less than the inside diameter of the stud and which latter is guided to allow of radial movement only.

Centrally disposed with respect to the various rolls 15 is the driving shaft 11, which extends parallel thereto and upon which is keyed to be driven thereby a roll 20 whose periphery is adapted to contact with the peripheries of the various independently mounted and independently rotating rolls 15.

Surrounding the entire rotating mechanism hereinbefore described, and binding the same into a unit as it were, is a circumscribing annular member 21 coaxial with the driving shaft 11 and provided with an internal surface 22 forming a path or track upon which the intermediate rolls 15 are adapted to run. The said rolls are forced within the annular member which is deformed thereby from the normal circular form (shown in dotted lines Fig. 2, the actual form when assembled being shown by full lines and greatly exaggerated). Member 21 possesses sufficient resiliency to allow the deformation of the member 21 and provides thereby the desired and a permanent pressure upon the various members, whereby a transmission of rotation between the driving shaft 11 and the said circumscribing member is effected and solely by rolling contact.

The rotation may be further transmitted directly from the member 21 in well-known manner; or, as herein shown, may be transmitted through a cylindrical frame 23 fixedly secured to said member and provided with a hub 24 coaxial with the driving shaft 11 and into which is fitted a driven shaft 25. As shown in the drawings, the shaft 11 is a driving shaft and the shaft 25 a driven shaft; but it is evident that the direction of transmission may be reversed and power brought in through the shaft 25 to run the motor 10 as a dynamo. The cylindrical wall of frame 23 is made sufficiently thin and possesses the required resiliency to allow, without creating undue stresses, of the changing deformation in the annular circumscribing member 21 as the same rotates. The construction set forth, moreover, affords not only a satisfactory and simple means of transmitting power, but provides at the same time an adequate end bearing for the driving mechanism.

I claim:—

1. In combination: a driving, and a driven member; a continuous, annular and resilient circumscribing member rotatable with one of said members; a rotatable roll centrally located within said circumscribing member and about the other of said drive members; a plurality of intermediate rolls adapted to ride upon said central roll and the inner surface of said circumscribing member, the latter through its resiliency exerting upon the rolls a predetermined and permanent pressure to effect a transmission between the said driving and driven members; and a resilient connection included between the said circumscribing member and the corresponding drive member.

2. In combination: a driving, and a driven member; a continuous, annular and resilient circumscribing member rotatable with one of said members; a rotatable roll centrally located within said circumscribing member and about the other of said drive members; a plurality of intermediate rolls adapted to ride upon said central roll and the inner surface of said circumscribing member, the latter through its resiliency exerting upon the rolls a predetermined and permanent pressure to effect a transmission between the said driving and driven members; and a cylinder fixedly secured to said circumscribing member, the wall thereof being resilient and the end provided with a central hub portion for external connection.

Signed at New York, in the county of New York and State of New York, this 8th day of April, A. D. 1915.

WILLIAM T. DONNELLY.